(12) United States Patent
Hirata et al.

(10) Patent No.: US 8,995,920 B2
(45) Date of Patent: Mar. 31, 2015

(54) WIRELESS COMMUNICATION APPARATUS, WIRELESS COMMUNICATION SYSTEM, AND COMMUNICATION METHOD

(75) Inventors: Kozue Hirata, Osaka (JP); Takashi Onodera, Osaka (JP); Hiroshi Nakano, Osaka (JP); Minoru Kubota, Osaka (JP); Naoki Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 754 days.

(21) Appl. No.: 13/378,027

(22) PCT Filed: May 26, 2010

(86) PCT No.: PCT/JP2010/003510
§ 371 (c)(1),
(2), (4) Date: Dec. 13, 2011

(87) PCT Pub. No.: WO2010/146774
PCT Pub. Date: Dec. 23, 2010

(65) Prior Publication Data
US 2012/0088453 A1    Apr. 12, 2012

(30) Foreign Application Priority Data
Jun. 16, 2009 (JP) .................................. 2009-143163

(51) Int. Cl.
*H04B 1/00* (2006.01)
*H04B 15/00* (2006.01)
(Continued)

(52) U.S. Cl.
CPC ........ *H04L 25/03305* (2013.01); *H04B 1/7107* (2013.01); *H04B 7/0691* (2013.01);
(Continued)

(58) Field of Classification Search
CPC .. H04B 1/7107; H04B 1/7117; H04B 7/0413; H04B 7/0691; H04L 1/0048; H04L 2025/03414; H04L 2025/03426; H04L 25/03171; H04L 25/03216; H04L 25/03286; H04L 25/03292; H04L 25/03305; H04L 25/03318; H04L 25/03343; H04L 5/0023

USPC ............................ 455/63.1, 65, 67.11, 67.13
See application file for complete search history.

(56) References Cited

U.S. PATENT DOCUMENTS 5,887,034 A * 3/1999 Suzuki .......................... 375/285
(Continued)

FOREIGN PATENT DOCUMENTS

| CN | 101449502 A | 6/2009 |
|---|---|---|
| JP | 2006-222742 A | 8/2006 |
| JP | 2008-193509 A | 8/2008 |

OTHER PUBLICATIONS

Hiroshi Harashima et al.: "Matched-Transmission Technique for Channels with Intersymbol Interference", IEEE Transactions on Communications, vol. Com-20, No. 4, Aug. 1972, pp. 774-780.
(Continued)

*Primary Examiner* — Lewis West
(74) *Attorney, Agent, or Firm* — Birch, Stewart, Kolasch & Birch, LLP

(57) ABSTRACT

A wireless communication apparatus includes: a channel information acquiring unit that, acquires a transmitted signal channel matrix that is channel information as a transmitted signal of a pre-interference-removal transmitted signal group and an interference signal channel matrix that is channel information as an interference signal of the non-interference-removed transmitted signal group; an interference signal calculating unit that generates an interference signal group at the time of reception by the non-interference-removed transmitted signal group with respect to the pre-interference-removal transmitted signal group, based on the pre-interference-removal transmitted signal group, the non-interference-removed transmitted signal group, the transmitted signal channel matrix, and the interference signal channel matrix; a subtracting unit that subtracts the interference signal group from the pre-interference-removal transmitted signal group to generate a post-interference-removal transmitted signal group; and a transmission antenna group that transmits the post-interference-removal transmitted signal group and the non-interference-removed transmitted signal group from mutually different transmission antennas.

7 Claims, 8 Drawing Sheets

(51) Int. Cl.
*H04L 25/03* (2006.01)
*H04B 1/7107* (2011.01)
*H04B 7/06* (2006.01)
*H04L 1/00* (2006.01)
*H04B 1/7117* (2011.01)
*H04B 7/04* (2006.01)
*H04L 5/00* (2006.01)

(52) U.S. Cl.
CPC ........ *H04L1/0048* (2013.01); *H04L 25/03343* (2013.01); *H04B 1/7117* (2013.01); *H04B 7/0413* (2013.01); *H04L 5/0023* (2013.01); *H04L 25/03171* (2013.01); *H04L 25/03216* (2013.01); *H04L 25/03286* (2013.01); *H04L 25/03292* (2013.01); *H04L 25/03318* (2013.01); *H04L 2025/03414* (2013.01); *H04L 2025/03426* (2013.01)
USPC ................... 455/63.1; 455/67.11; 455/67.13; 455/65

(56) References Cited

U.S. PATENT DOCUMENTS

| | | | | |
|---|---|---|---|---|
| 6,243,412 B1* | 6/2001 | Fukawa | ........................ | 375/219 |
| 6,700,977 B2* | 3/2004 | Sugiyama | ................ | 379/406.08 |
| 8,130,862 B2* | 3/2012 | Forenza et al. | ................ | 375/295 |
| 8,130,881 B1* | 3/2012 | Gossett et al. | ................ | 375/350 |
| 2008/0273618 A1* | 11/2008 | Forenza et al. | ................ | 375/261 |
| 2009/0125793 A1 | 5/2009 | Kishigami et al. | | |

OTHER PUBLICATIONS

PCT/ISA/210—International Search Report dated Jun. 29, 2010 for PCT/JP2010/003510.

Tarkesh Pande et al.: "Reduced Feedback MIMO-OFDM Precoding and Antenna Selection", IEEE Transactions on Signal Processing, May 2007, vol. 55, No. 5, pp. 2284-2293.

* cited by examiner

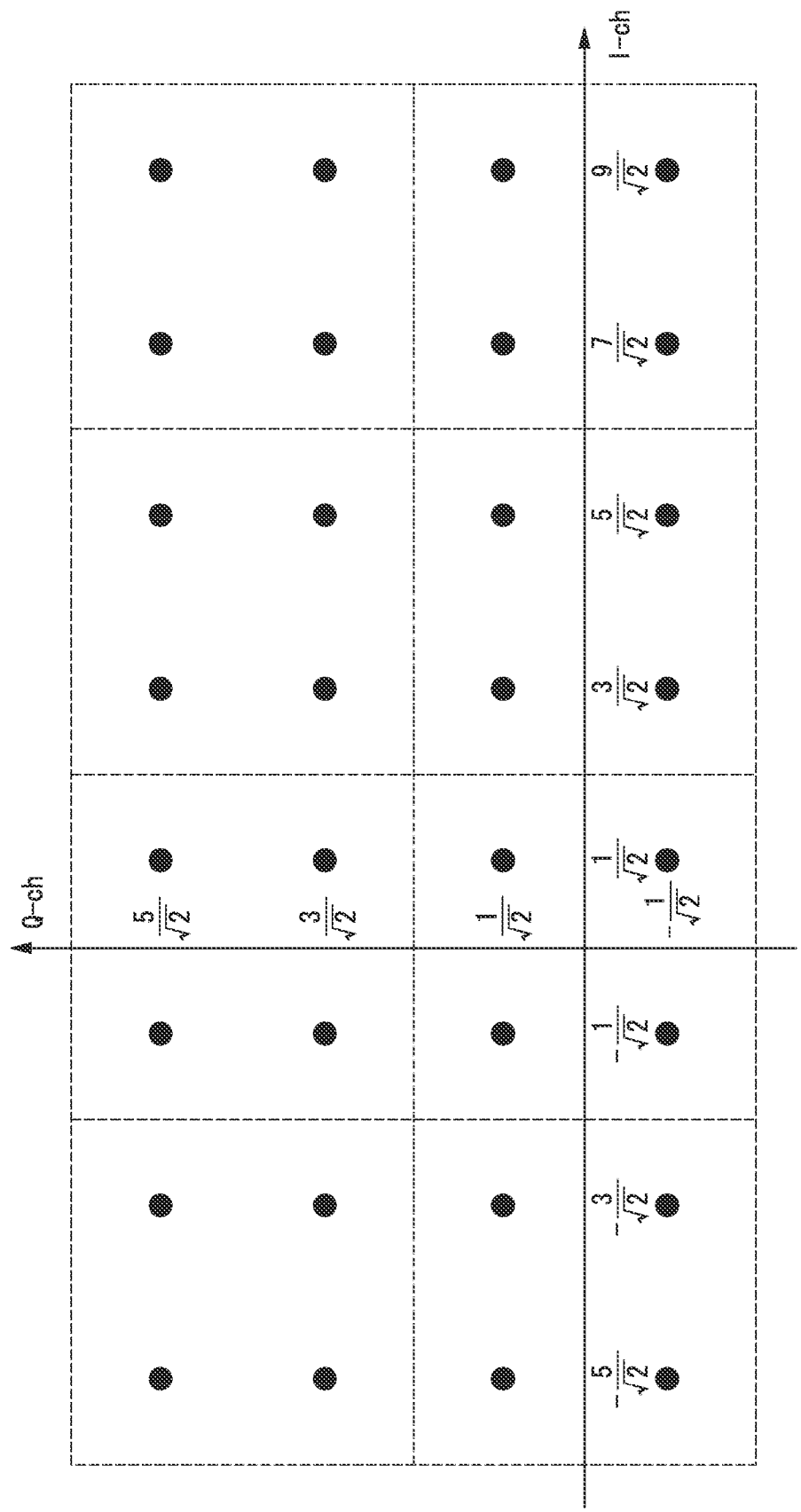

WIRELESS COMMUNICATION APPARATUS, WIRELESS COMMUNICATION SYSTEM, AND COMMUNICATION METHOD

TECHNICAL FIELD

The present invention relates to a wireless communication apparatus, a wireless communication system, and a communication method.

The present application claims priority based on the patent application No. 2009-143163 filed in Japan on Jun. 16, 2009 and incorporates by reference herein the content thereof.

BACKGROUND ART

In recent years, standardization of $4^{th}$ generation mobile communication has been underway, and various investigations have been conducted for the purpose of accomplishing the improvement of the downlink transfer rate. The downlink is communication from a base station to a mobile station. One method that can be envisioned for improving the transfer rate is that of widening the system bandwidth. However, the widening of the system bandwidth is restricted because of limited frequency resources. Given this, investigations are done regarding MIMO (multiple-input, multiple-output), which enables spatial multiplexing of a plurality of signals, using one and the same of the time and of the frequency, without widening the frequency bandwidth, as the practical technology. MIMO multiplexing technology is spatial multiplexing transmitting technology, whereby spatial multiplexing is done by providing a plurality of antennas for both transmitting and receiving sides and simultaneously transmitting different signal streams from the plurality of transmission antennas.

In 3.9G, to satisfy the requirement condition for a transfer rate of 300 Mbps (megabits/second), MIMO technology that provides four antennas and enables maximum four-fold multiplexing is used. In the $4^{th}$ generation, considering the requirement for a 1-Gbps (gigabit/second) bandwidth, it is necessary to have spatial multiplexing up to a maximum of eight-fold, and related investigations are being conducted. In this case, methods for separating MIMO-multiplexed signals can be generally divided into two types: methods in which signal separation is done at the receiving side, and methods in which signal processing is done at the transmitting side.

The wireless channel in a mobile communication system is constituted by a large number of channels with different delay times. For this reason, at the receiving side, in addition to the desired signal to be transmitted and received, there are a large number of interference signals. The reception characteristics, therefore, are influenced by the influence of interference and the influence of noise.

Methods of separating multiplexed signals at the receiving side include MMSE (minimum mean square error) and MLD (maximum likelihood detection). With these methods, using the received signals of each reception antenna and the characteristics of the channels through which the signals pass, detection is performed of the desired signal to be transmitted and received, taking into consideration the influence of the interference and noise on the channels. The reception characteristics are relatively good. With WILD in particular, it is possible for all combinations of modulated signals that can be transmitted from the transmission antenna to select the one that has the highest probability of being the one that was transmitted. For this reason, MLD is the optimum receiving detection method, and achieves good transfer characteristics.

Transmitting equalization techniques such as ZF (zero forcing) and THP (Tomlinson-Harashima precoding) have been proposed as methods of signal processing at the transmitting side (refer to Non-Patent Document 1). Transmitting equalization techniques are techniques that suppress at the transmitting side the influence of interference received on the channel. Specifically, in transmitting equalization, the channel characteristics that are estimated for each reception antenna are fed back to the transmitting side. Then, at the transmitting side, the influence of interference on the channel is calculated based on that channel information, and the signal is processed prior to transmitting, so that it is possible at the receiving side to receive a signal in which the influence of interference has been cancelled out. Although the reception characteristics are deteriorated from those of a method that performs MIMO signal separation (separation of signals as the MIMO receiving side, hereinafter "MIMO separation"), the receiving processing is simple.

PRIOR ART DOCUMENTS

Non-Patent Document

Non-Patent Document 1: Harashima et al (1), "Matched-Transmission Technique for Channels With Intersymbol Interference," IEEE Transactions on Communications, August, 1972, Vol. COM-20, No. 4, pp 774-780.

DISCLOSURE OF INVENTION

Problem to be Solved by the Invention

As described above, in the case of attempting to improve the transfer rate by MIMO techniques, it is effective to perform the receiving processing for the purpose of separating MIMO multiplexed signals at the receiving side. However, separation of MIMO multiplexing at the receiving side involves matrix operations, leading to the problem of a huge amount of calculations. In particular, in the case of applying MLD, which is an optimum receiving method in MIMO separation, the amount of calculations increases exponentially with respect to the degree of spatial multiplexing and the number of modulation levels, leading to unrealistic receiving processing, depending upon the degree of multiplexing and modulation method, thereby making implementation difficult.

In contrast, in the case of performing signal processing at the transmitting side, which is another method, if the channel information is fed back to the transmitting side, it is possible, by processing at the transmitting side, to receive without an accompanying large amount of calculations at the receiving side. However, the amount of channel information to be fed back increases with an increase in degree of multiplexing, causing not only an increase in overhead, but also the problem of a deterioration in the reception characteristics in comparison with receiving processing such as is done with MLD.

The present invention was made in consideration of the above-described situation, and has as an object to provide a wireless communication apparatus, a wireless communication system, and a communication method, wherein in MIMO multiplexing there is no required increase in the above-described amount of calculation and amount of fed back information.

Means for Solving the Problem

[1] The present invention has been made to solve the above-described problems, and a first aspect of the present invention is a wireless communication apparatus including: a channel information acquiring unit that, based on a received signal, acquires a transmitted signal channel matrix that is channel information as a transmitted signal of a pre-interference-removal transmitted signal group and an interference signal channel matrix that is channel information as an interference signal of the non-interference-removed transmitted signal group; an interference signal calculating unit that generates an interference signal group at the time of reception by the non-interference-removed transmitted signal group with respect to the pre-interference-removal transmitted signal group, based on the pre-interference-removal transmitted signal group, the non-interference-removed transmitted signal group, the transmitted signal channel matrix, and the interference signal channel matrix; an interference signal subtracting unit that subtracts the interference signal group from the pre-interference-removal transmitted signal group to generate a post-interference-removal transmitted signal group; and a transmission antenna group that transmits the post-interference-removal transmitted signal group and the non-interference-removed transmitted signal group from mutually different transmission antennas.

This wireless communication apparatus transmits by subtracting the interference signal group at the time of reception from the pre-interference-removal transmitted signal group by the non-interference-removed transmitted signal group. By doing this, the transmitted signal group can be transmitted so as to enable separate estimation of the desired signal of the pre-interference removal transmitted signal group and the estimation of the desired signal of the non-interference removed transmitted signal group at the receiving side.

Also, because the channel information can be the transmitted signal channel matrix and the interference signal channel matrix, compared with a conventional method of subtracting an interference signal at the transmitting side, such as in transmitting zero forcing, it is possible to reduce the required amount of channel information. Therefore, in the case in which the channel information is received, it is possible to reduce the amount of communication. Also, in the case of generating the channel information at the local wireless communication apparatus, it is possible to reduce the amount of calculation.

[2] In the first aspect of the present invention, the wireless communication apparatus may further include: a modulo unit in which each signal of the post-interference-removal transmitted signal group is divided by a modulo width that is a pre-established constant and determines the remainder to generate a power-suppressed transmitted signal group; wherein the transmission antenna group transmits a power-suppressed transmitted signal group and the non-interference-removed transmitted signal group from mutually different transmission antennas.

With this wireless communication apparatus, modulo calculation is performed further and, by doing so, it is possible to achieve the same type of effect as that of the above-described wireless communication apparatus, while suppressing the transmitting power of the power-suppressed transmitted signal group.

[3] A second aspect of the present invention is a wireless communication apparatus including: a plurality of antennas that receive a post-interference-removal transmitted signal group and a non-interference-removed transmitted signal group; a post-interference-removal desired transmitted signal group decoding unit that decodes the desired signal with respect to the received post-interference-removal transmitted signal group to generate a desired signal estimated value group; a replica generating unit that calculates an estimated value of an interference signal of the post-interference-removal transmitted signal group with respect to the non-interference-removed transmitted signal group from the desired signal estimated value group; a replica subtracting unit that subtracts a estimated value of the interference signal from the received the non-interference-removed transmitted signal group to generate a post-replica-subtracted signal group; and a non-interference-removed desired transmitted signal group decoding unit that decodes the desired signal with respect to the post-replica-subtracted signal group.

With this wireless communication apparatus, when decoding the desired signal with respect to the post-interference-removal transmitted signal group, the non-interference-removed transmitted signal component is removed. Also, when decoding the desired signal with respect to the non-interference-removed transmitted signal group, the post-interference-removal transmitted signal group component is removed. For this reason, the number of candidate points for the desired signal is small, and the amount of calculation required for decoding can be reduced.

[4] In the second aspect of the present invention, the plurality of antennas may receive the power-suppressed transmitted signal group and the non-interference-removed transmitted signal group; the post-interference-removal desired transmitted signal group decoding unit may calculate, based on an amplitude of the received power-suppressed transmitted signal group, a shift amount by a remainder operation that is performed with respect to the power-suppressed transmitted signal group to generate a desired signal estimated value group using the shift amount; and wherein the replica generating unit may generate a replica signal group of the interference components of the power-suppressed transmitted signal group with respect to the non-interference-removed transmitted signal group from a shift amount by the remainder operation that is performed with respect to the desired signal estimated value group and the power-suppressed transmitted signal group.

This wireless communication apparatus considers modulo calculation in decoding the power-suppressed transmitted signal group and generating a replica signal group. For this reason, it is possible to receive the modulo-calculated transmitted signal and achieve the same effect as the above-described wireless communication apparatus.

[5] A third aspect of the present invention is a wireless communication system including a transmitting-side communication apparatus for a desired signal and a receiving-side communication apparatus for a desired signal, wherein the transmitting-side communication apparatus for a desired signal including: a channel information acquiring unit that, based on the received signal, acquires a transmitted signal channel matrix that is channel information as a transmitted signal of a pre-interference-removal transmitted signal group and an interference signal channel matrix that is channel information as an interference signal of the non-interference-removed transmitted signal group; an interference signal calculating unit that generates an interference signal group at the time of reception by the non-interference-removed transmitted signal group with respect to the pre-interference-removal transmitted signal group, based on the pre-interference-removal transmitted signal group, the non-interference-removed transmitted signal group, the transmitted signal channel matrix and the interference signal channel matrix; an interference signal subtracting unit that subtracts the interference signal group from the pre-interference-removal transmitted signal group to generate a post-interference-removal transmitted signal group; and a transmission antenna group that transmits the post-interference-removal transmitted signal group and the non-interference-removed transmitted signal group from mutually different transmission antennas; and a receiving-side communication apparatus for a desired signal including:

a plurality of antennas that receive a post-interference-removal transmitted signal group and a non-interference-removed transmitted signal group; a post-interference-removal desired-transmitted signal group decoding unit that decodes the desired signal with respect to the received post-interference-removal transmitted signal group to generate a desired signal estimated value group; a replica generating unit that calculates an estimated value of an interference signal of the post-interference-removal transmitted signal group with respect to the non-interference-removed transmitted signal group from the desired signal estimated value group; a replica subtracting unit that subtracts a estimated value of the interference signal from the received the non-interference-removed transmitted signal group to generate a post-replica-subtracted signal group; and a non-interference-removed desired transmitted signal group decoding unit that decodes the desired signal with respect to the post-replica-subtracted signal group.

In this wireless communication system, at the transmitting-side communication apparatus for a desired signal, it is sufficient that transmitted signal channel matrix and the interference signal channel matrix can be used as the channel information. For this reason, compared with a conventional method of subtracting the interference signal at the transmitting side, such as in transmitting zero forcing it is possible to reduce the required amount of channel information. Therefore, in the case in which the channel information is received, the amount of communication can be reduced. Also, in the case of generating the channel information at the local wireless communication apparatus, it is possible to reduce the amount of calculation.

Also, at the receiving side communication apparatus for a desired signal, when decoding the desired signal with respect to the post-interference-removal transmitted signal group, the non-interference-removed transmitted signal group component is removed. For this reason, the number of candidate points for the signal is small, and the amount of calculation required for decoding can be reduced.

[6] In the third aspect of the present invention, the transmitting-side communication apparatus for a desired signal may further include: a modulo unit in which each signal of the post-interference-removal transmitted signal group is divided by a modulo width that is a pre-established constant and determines the remainder to generate a power-suppressed transmitted signal group; and in which the transmission antenna group transmits the power-suppressed transmitted signal group and the non-interference-removed transmitted signal group from mutually different transmission antennas; and wherein in the receiving-side communication apparatus for a desired signal, the plurality of antennas may receive power-suppressed transmitted signal group and the non-interference-removed transmitted signal group; the post-interference-removal desired transmitted signal group decoding unit may calculate, based on an amplitude of the received power-suppressed transmitted signal group, a shift amount by a remainder operation that is performed with respect to the power-suppressed transmitted signal group to generate a desired signal estimated value group, using the sift amount; and wherein the replica generating unit may generate a replica signal group of the interference components of the power-suppressed transmitted signal group with respect to the non-interference-removed transmitted signal group from a shift amount by a remainder operation that is performed with respect to the desired signal estimated value group and the power-suppressed transmitted signal group.

In this wireless communication system, in the receiving side communication apparatus for a desired signal, modulo calculation is performed, and in the receiving side communication apparatus for the desired signal, the modulo calculation is considered in decoding the power-suppressed transmitted signal group and generating a replica signal group. For this reason, it is possible to achieve the same effect as with the above-described wireless communication system, while suppressing the transmitting voltage by modulo calculation.

[7] A fourth aspect of the present invention is a communication method: wherein; a first communication apparatus that has a plurality of transmission antennas and that transmits a plurality of transmitted signals on one and the same carrier frequency at one and the same time divides the plurality of transmitted signals into a plurality of groups and, with respect to one group of transmitted signals, uses signals that have had the interference signal subtracted beforehand; and a second communication apparatus that has a plurality of reception antennas and that receives the plurality of transmitted signals being spatially multiplexed, by receiving the transmitted signals from which the interference signal is subtracted beforehand, decodes the received signals of this group and also decodes transmitted signals belonging to another group by using the decoded signals.

In this communication method, with regard to one group of transmitted signals, signals that have had the interference signal subtracted beforehand are used. For this reason, the number of candidate points for the desired signal is small, and it is possible to reduce the amount of calculation required for decoding. Also, when decoding transmitted signals belonging to another group, the transmitted signals of the other group are decoded by using the above-noted decoded signals. By doing this, the number of candidate points for the signal is small, and it is possible to reduce the amount of calculation required for decoding.

Effects of the Invention

According to the present invention, it is possible to reduce the amount of calculation for signal separation at the transmitting apparatus on the receiving side of the desired signal, while reducing the amount of channel information fed back to the transmitting device side transmitting the desired signal, thereby implementing efficient MIMO multiplexing. By doing this, it is possible to provide a wireless communication apparatus, a wireless communication system, and a communication method which can provide excellent transmission characteristics with MIMO technology.

BRIEF DESCRIPTION OF THE DRAWINGS

FIG. 8 is a configuration diagram showing the configuration in the same embodiment, seen on a complex plane, of candidates for the transmitted signal points, with respect to the signals of one transmission antenna provisionally separated by the modulo-considering maximum likelihood judging unit 830.

BEST MODE FOR CARRYING OUT THE INVENTION

First Embodiment

An embodiment of the present invention is described below, with references made to the drawings.

Figure 1:
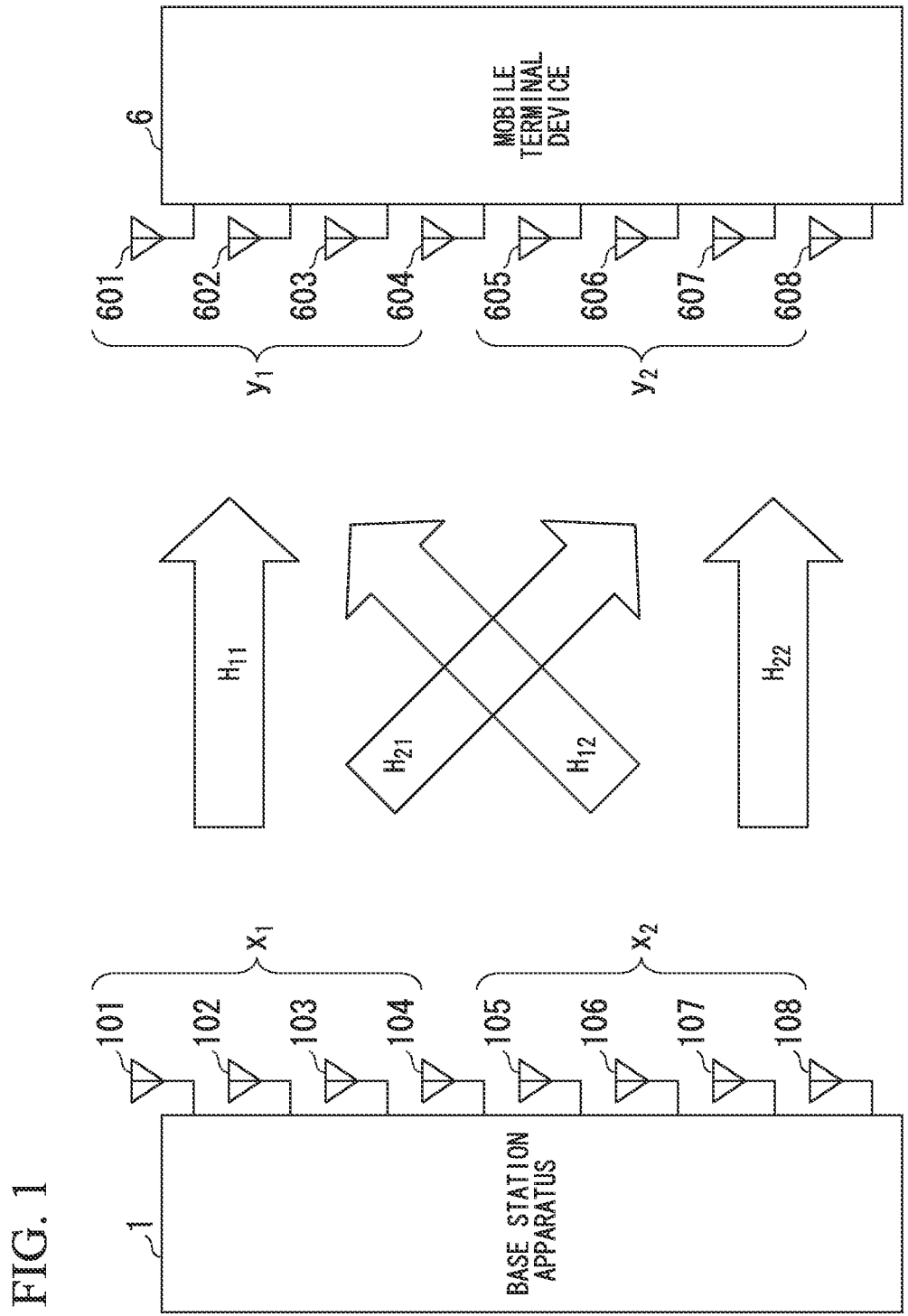
FIG. 1 is a schematic representation showing the configuration of a channel of a wireless signal between a base station apparatus 1 and a mobile terminal device 6 in a first embodiment of the present invention.

FIG. 1 is a schematic representation showing the configuration of channels of a wireless signal between a base station apparatus 1 and a mobile terminal device 6 in a first embodiment of the present invention. The base station apparatus 1 is a communication apparatus at the transmitting side of the desired signal. The mobile terminal device 6 is a communication device on the side that receives the desired signal. The communication apparatuses in this embodiment can be communication apparatuses that perform communication by MIMO multiplexing, but are not restricted to the base station apparatus and the mobile terminal device. The terminal device may also be a fixed terminal device that does not move.

In FIG. 1, the base station apparatus 1 includes the eight antennas 101 to 108. The mobile terminal device 6 includes the eight antennas 601 to 608. As will be described below, the 16 channels between each of the antennas 101 to 104 and each of the antennas 601 to 604 are represented by a channel matrix $H_{11}$, and the 16 channels between each of the antennas 105 to 108 and each of the antennas 601 to 604 are represented by a channel matrix $H_{12}$. The 16 channels between each of the antennas 101 to 104 and each of the antennas 605 to 608 are represented by a channel matrix $H_{21}$.

The 16 channels between each of the antennas 105 to 108 and each of the antennas 605 to 608 are represented by a channel matrix $H_{22}$. The wireless signal channels between the base station apparatus 1 and the mobile terminal device 6 are these 64 channels. Although $H_{11}$, $H_{12}$, $H_{21}$, and $H_{22}$ are matrices, they will not be indicated in bold font herein. In the following, the omission of bold font representations will apply as well to matrices $A_{11}$, $A_{12}$, and $A_{22}$, to vectors $x_1$, $x_2$, $y_1$, $y_2$, $\eta_1$, $\eta_2$, $s_1$, $s_2$, $W_1$, $W_2$, $W_3$, $W_4$, $x'_2$, $k'$, and to the vector or matrix A.

The base station apparatus 1 and the mobile terminal device 6 perform communication using the OFDM (orthogonal frequency division multiplexing) system. The base station apparatus 1 and the mobile terminal device 6 perform communication using QPSK (quaternary phase shift keying) as the modulation method. The base station apparatus 1 transmits eight streams of different transmitted signals to the mobile terminal device 6. The mobile terminal device 6 performs 4×4 MIMO receiving processing two times so as to perform 8×8 MIMO receiving processing. In these representations, the number to the left of x is the number of transmission antennas, and the number to the right of x is the number of reception antennas.

In FIG. 1, transmitted signal vector (hereinafter, transmitted signal) for transmitting from the transmission antennas 101 to 104 of the base station apparatus 1 is indicated by $x_1$, and the signal vector of transmitted signals from the transmission antennas 105 to 106 is indicated by $x_2$. In this case, $x_1$ and $x_2$ are indicated by the following Equation (1).

$$\left. \begin{array}{l} x_1 = [\, x'_1 \;\; x'_2 \;\; x'_3 \;\; x'_4 \,]^T \\ x_2 = [\, x'_5 \;\; x'_6 \;\; x'_7 \;\; x'_8 \,]^T \end{array} \right\} \qquad \text{Equation (1)}$$

In Equation (1), $x'_m$ is the complex number transmitted symbol transmitted from the m-th transmission antenna ($1 \leq m \leq 8$). $A^T$ represents the transposed vector (or matrix) of the vector (or matrix) A. In the same manner, the complex number received signal vector (hereinafter, also called the received signal) in the reception antennas 601 to 604 of the mobile terminal device 6, which is a receiving device, is $y_1$, and the complex number received signal vector in the reception antennas 605 to 608 is $y_2$. With regard to the channel characteristics of the wireless channel, the channel matrix between the transmission antennas 101 to 104 and the reception antennas 601 to 604 is represented by $H_{11}$, which is given by Equation (2).

$$H_{11} = \begin{bmatrix} H'_{11} & H'_{12} & H'_{13} & H'_{14} \\ H'_{21} & H'_{22} & H'_{23} & H'_{24} \\ H'_{31} & H'_{32} & H'_{33} & H'_{34} \\ H'_{41} & H'_{42} & H'_{43} & H'_{44} \end{bmatrix} \qquad \text{Equation (2)}$$

In this case, $H'_{nm}$ represents the complex number channel gain between the m-th transmission antenna ($1 \leq m \leq 8$) and the n-th reception antenna ($1 \leq n \leq 8$). In the same manner, $H_{12}$ represents the channel matrix from the transmission antennas 101 to 104 to the reception antennas 605 to 608, $H_{21}$ represents the channel matrix from the transmission antennas 105 to 108 to the reception antennas 601 to 604, and $H_{22}$ represents the channel matrix from the transmission antennas 105 to 108 to the reception antennas 605 to 608. Given this, the received signal vectors $y_1$ and $y_2$ are given by Equation (3).

$$\begin{bmatrix} y_1 \\ y_2 \end{bmatrix} = \begin{bmatrix} H_{11} & H_{12} \\ H_{21} & H_{22} \end{bmatrix} \begin{bmatrix} x_1 \\ x_2 \end{bmatrix} + \begin{bmatrix} \eta_1 \\ \eta_2 \end{bmatrix} \qquad \text{Equation (3)}$$

In the above, $\eta_1$ and $\eta_2$ represent the noise vectors in each of the reception antennas 601 to 604 and the reception antennas 605 to 608. In order for the mobile terminal device 6 to implement the receiving processing of the received signal vectors $y_1$ and $y_2$ by performing 4×4 MIMO receiving processing two times, the base station apparatus 1 performs signal processing so that the received signal vector $y_2$ do not include the transmitted signal vector $x_1$ components. Under this condition, the received signal vectors $y_1$ and $y_2$ are given by Equation (4).

$$\begin{bmatrix} y_1 \\ y_2 \end{bmatrix} = \begin{bmatrix} A_{11} & A_{12} \\ 0 & A_{22} \end{bmatrix} \begin{bmatrix} s_1 \\ s_2 \end{bmatrix} + \begin{bmatrix} \eta_1 \\ \eta_2 \end{bmatrix} \qquad \text{Equation (4)}$$

In Equation (4), $s_1$ and $s_2$ are complex number transmitted signal vectors indicating the desired signal transmitted from the transmission antennas 101 to 104 and 105 to 108, respectively, (the desired signal that is to be decoded at the mobile terminal device 6). The base station apparatus 1 performs signal processing at the transmitting side with respect to the desired signal transmitted signal vectors $s_1$ and $s_2$ in Equation (4), so that the components of the transmitted signal vector $x_1$ are not included in the received signal vector $y_2$. Specifically, the base station apparatus 1 processes the transmitted signal vectors $x_1$ and $x_2$ so that they are respectively as shown in Equation (5).

$$\left.\begin{array}{l} x_1 = s_1 \\ x_2 = s_2 - H_{22}^{-1} H_{21} s_1 \end{array}\right\} \quad \text{Equation (5)}$$

The base station apparatus 1 transmits the transmitted signals shown in Equation (5). By doing this, the signals received by the mobile terminal device 6 are as shown in Equation (6) respectively.

$$\left.\begin{array}{l} y_1 = H_{11}s_1 + H_{12}(s_2 - H_{22}^{-1} H_{21} s_1) + \eta_1 \\ \quad = (H_{11} - H_{12} H_{22}^{-1} H_{21})s_1 + H_{12}s_2 + \eta_1 \\ y_2 = H_{21}s_1 + H_{22}(s_2 - H_{22}^{-1} H_{21} s_1) + \eta_2 \\ \quad = H_{22}s_2 + \eta_2 \end{array}\right\} \quad \text{Equation (6)}$$

Therefore, $A_{11}$, $A_{12}$, and $A_{22}$ are, respectively, as shown below.

$$\left.\begin{array}{l} A_{11} = H_{11} - H_{12} H_{22}^{-1} H_{21} \\ A_{12} = H_{12} \\ A_{22} = H_{22} \end{array}\right\} \quad \text{Equation (7)}$$

As noted above, the base station apparatus 1 performs transmitted signal processing based on Equation (5), using $H_{12}$ and $H_{22}$. The mobile terminal device 6 performs signal processing so as to separate the 4×4 MIMO multiplexing from the received signal $y_2$ shown in Equation (6), subtracts $H_{12}s_2$ from the received signal $y_1$ shown in Equation (6) using the received signal $s_2$, and detects $s_1$ by performing signal processing that separates the 4×4 MIMO multiplexing. In this manner, the base station apparatus 1 transmits, removing the interference between a part of the antennas.

As will be described below, the mobile terminal device 6 detects the transmitted data from the signal from which interference between antennas has been removed, and, after cancelling a transmitted signal replica (copy) that is generated from the detected transmitted data, from the received signal without removal of the interference. By doing this, it is possible to achieve signal processing that has a degree of multiplexing that is less than the actual degree of MIMO multiplexing (for example, performing 4×4 MIMO multiplexing separation processing two times to perform 8×8 MIMO multiplexing separation), thereby enabling reduction of the calculation amount of received processing. Also, the transmitting apparatus need only remove a part of the interference. For this reason, the amount of information regarding interference between antennas and the amount of equivalent channel information to be fed back can be reduced.

The number of antennas of the base station apparatus 1 and the mobile terminal device 6 is a plurality of antennas, not restricted to eight. Additionally, the number of base station apparatus 1 antennas and the number of mobile terminal device 6 antennas may differ. Also, the method of dividing the transmitted data antennas is not restricted to four antennas for each of two transmitted data, and may be simply division into a plurality of transmitted data. For example, eight transmitted data may be divided into four groups of two antennas each, or groups of two, two, and four antennas.

In the case of dividing eight transmitted data into four transmitted data of two antennas each (indicated, respectively, by the transmitted signal vectors, $W_1$, $W_2$, $W_3$, and $W_4$), the base station apparatus 1 performs removal of the interference of the transmitted signal vector $W_1$ with respect to the transmitted signal vectors $W_2$, $W_3$, and $W_4$, removal of the interference of the transmitted signal vector $W_2$ with respect to the transmitted signal vectors $W_3$ and $W_4$, and removal of the interference of the transmitted signal vector $W_3$ with respect to the transmitted signal vector $W_4$. The mobile terminal device 6 detects the desired signal from the transmitted signal vector $W_4$ that is not interfered with by the other signals, and uses the detected transmitted signal to calculate and remove the interference component of the transmitted signal vector $W_4$ with respect to the transmitted signal vector $W_3$, thereby detecting from the obtained signal the desired transmitted signal corresponding to the transmitted signal vector $W_3$.

Additionally, the mobile terminal device 6 uses the desired transmitted signals corresponding to the transmitted signal vectors $W_3$ and $W_4$ to calculate and remove the interference components of the transmitted signal vectors $W_3$ and $W_4$ with respect to the signal vector $W_2$, thereby detecting from the obtained signal the desired transmitted signal corresponding to the transmitted signal vector $W_2$. The mobile terminal device 6, in the same manner with respect to the transmitted signal vector $W_1$, uses the desired transmitted signals corresponding to the transmitted signal vectors $W_2$, $W_3$, and $W_4$ to perform interference removal and detection of the desired transmitted signal.

The communication system between the base station apparatus 1 and the mobile terminal device 6 is not restricted to OFDM and may be, for example, another multicarrier communication system such as FDMA and may also be a single-carrier communication system. Also, the method of modulation between the base station apparatus 1 and the mobile terminal device 6 is not restricted to QPSK, and may be, for example, BPSK (binary phase-shift keying) or 16QAM (16-position quadrature amplitude modulation) or yet a different modulation method.

Figure 2:
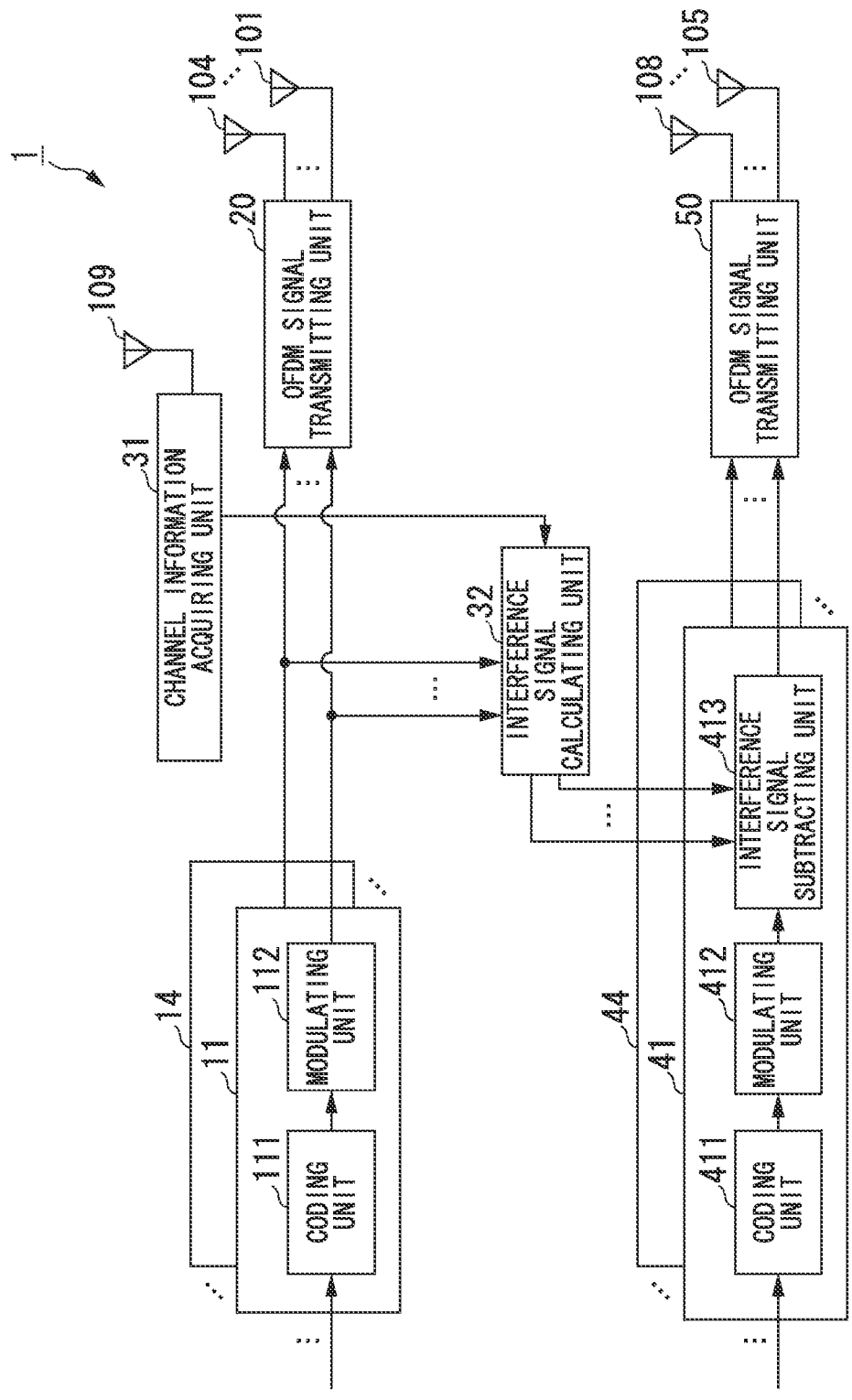
FIG. 2 is a schematic block diagram showing the configuration of the base station apparatus 1 in the same embodiment.

FIG. 2 is a schematic block diagram showing the configuration of the base station apparatus 1.

In FIG. 2, the base station apparatus 1 includes non-interference-subtracted signal generating units 11 to 14, OFDM signal transmitting units 20 and 50, channel information acquiring unit 31, interference signal calculating unit 32, interference-subtracted signal generating units 41 to 44, and transmission antennas 101 to 108.

The non-interference-subtracted signal generating units 11 to 14 receive the input transmitted bit streams and generate modulated signals. Because the non-interference-subtracted signal generating units 11 to 14 have the same configurations and functions, the description will be presented for one as a representative (the non-interference-subtracted signal generating unit 11). The non-interference-subtracted signal generating unit 11 includes a coding unit 111 and a modulating unit 112.

The coding unit 111 performs error-correcting coding of the input transmitted bit stream. In this case, the transmitted bit stream is the bit stream represented information data to be transmitted. Also it is desirable to use Turbo code, LDPC (low-density parity check) code, or convolutional code, this is not a restriction. The modulating unit 112 generates a modulated signal by modulating with the coded transmitted bit stream.

The OFDM signal transmitting unit 20 is connected to the transmission antennas 101 to 104. The OFDM signal transmitting unit 20 converts the modulated signals generated by the non-interference-subtracted signal generating units 11 to 14 into an OFDM signal, and transmits them from the transmission antennas 101 to 104 to the mobile terminal device 6. Details of the OFDM signal transmitting unit 20 are described later.

The channel information acquiring unit 31 is connected to the reception antenna 109. The channel information acquiring unit 31 receives channel information (channel matrices $H_{21}$ and $H_{22}$) from the mobile terminal device 6 via the reception antenna 109.

Using the inverse channel characteristics, the channel information may be generated by the base station apparatus 1 receiving a reference signal from the mobile terminal device 6. In this case, the mobile terminal device 6 transmits from the reception antennas 605 to 608 (used in this case as transmission antennas) as reference signals that are known to both the base station apparatus 1 and the mobile terminal device 6.

When this is done, while transmitting the reference signal from one antenna, the mobile terminal device 6 transmits nothing on the same frequency as the reference signal from the other transmission antennas, so that the base station apparatus 1 can receive the reference signal without the influence of signals from the other antennas. The base station apparatus 1 receives the reference signal transmitted by the mobile terminal device 6 using the transmission antennas 101 to 108 (used in this case as reception antennas). The channel information acquiring unit 31 of the base station apparatus 1 compares the known signal with the received reference signal and calculates the offsets in phase and amplitude in the channels from each of the transmission antennas to each of the reception antennas.

Sixteen complex numbers representing the offsets in phase and amplitude of the each of the 16 channels from each of the transmission antennas 101 to 104 to each of the reception antennas 605 to 608 are taken as the channel matrix $H_{21}$. The 16 complex numbers representing the offsets in phase and amplitude of the each of the 16 channels from each of the transmission antennas 105 to 108 to each of the reception antennas 605 to 608 are taken as the channel matrix $H_{22}$. In this manner, the channel information acquiring unit 31 acquires the channel matrices $H_{22}$ and $H_{21}$ based on the received reference signals.

The interference signal calculating unit 32 removes the influence of the transmitted signal matrix $s_1$ (non-interference-removed transmitted signal group) on the transmitted signal matrix $s_2$ (pre-interference-removal transmitted signal group). For this reason, the interference calculating unit 32 calculates the interference channel matrix $H_{22}^{-1}H_{21}$ from the channel matrix (transmitted signal channel matrix) $H_{22}$ with $s_2$ as the transmitted signal and the channel matrix (interference signal channel matrix) $H_{21}$ channel matrix with $s_1$ as the transmitted signal, and performs multiplication by $s_1$ to generate the interference signal (group). In this case, $H_{22}^{-1}$ is the inverse matrix of the matrix $H_{22}$. Also, in the case in which there is a difference in the number of rows and columns in the matrix (i.e., in the case in which the matrix is not a square matrix), $H_{22}^{-1}$ is the pseudo-inverse matrix of $H_{22}$. In this case, the channel information $H_{21}$ and $H_{22}$ input to the interference signal calculating unit 32 is that which is received by the channel information acquiring unit 31 from the mobile terminal device 6.

Interference signal subtracting units 413 to 443 (not shown) subtract the interference signal $H_{22}^{-1}H_{21}s_1$ calculated by the interference signal calculating unit 32 from the transmitted signal matrix $s_2$ to generate the transmitted signal from which the interference has been removed (post-interference-removal signal group), which is input as the data signal to the OFDM signal transmitting unit 50.

Because the configuration and the function of the OFDM signal transmitting unit 50 are the same as the OFDM signal transmitting unit 20 to be described later, the description thereof is omitted herein. The OFDM signal transmitting unit 50 converts the post-interference-removal transmitted signals input thereto to OFDM signals, and transmits them to the mobile terminal device 6 from the transmission antennas 105 to 108.

Figure 3:
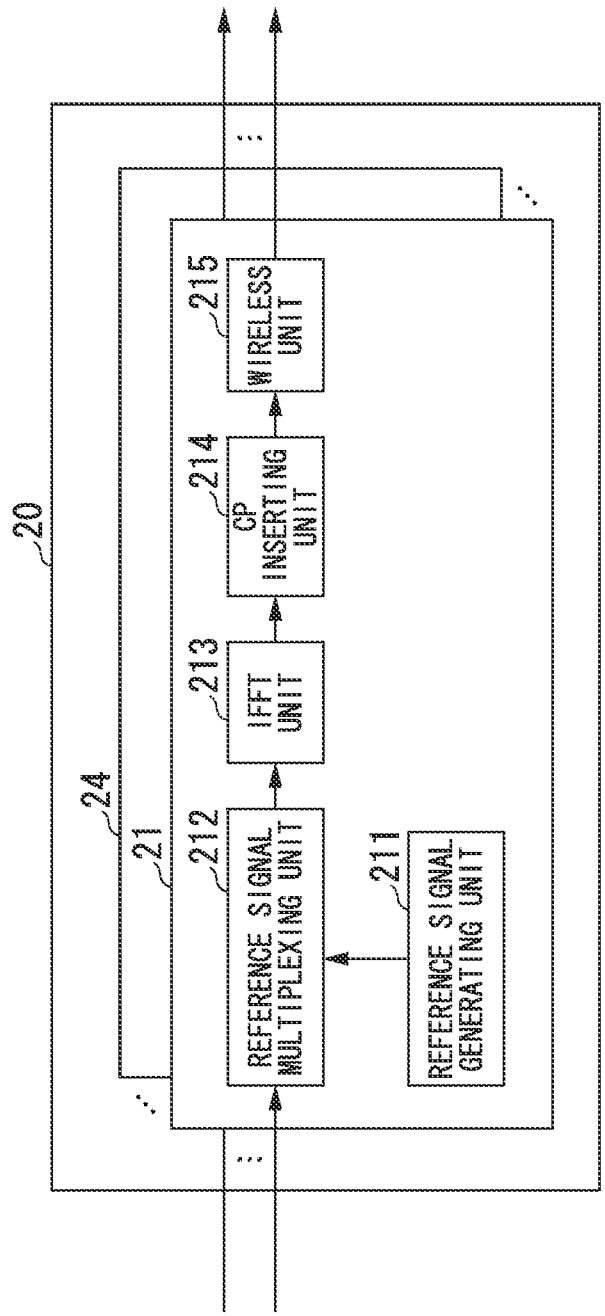
FIG. 3 is a schematic block diagram showing the configuration of an OFDM signal transmitting unit 20 in the same embodiment.

FIG. 3 is a schematic block diagram of the OFDM signal transmitting unit 20 (FIG. 2).

The OFDM signal transmitting unit 20 includes OFDM signal transmitting units 21 to 24 for each of the transmission antennas. The OFDM signal transmitting units 21 to 24 receive the input of the data signals for each of the transmission antennas and transmits them as OFDM signals. Because the configuration and function of each of the OFDM signal transmitting units 21 to 24 are the same, a description will be presented for one of them (OFDM signal transmitting unit 21). The OFDM signal transmitting unit 21 includes a reference signal generating unit 211, a reference signal multiplexing unit 212, an IFFT unit 213, a CP inserting unit 214, and a wireless unit 215.

The reference signal generating unit 211 generates a known signal (reference signal) for the purpose of estimating the channel characteristics. The reference signal multiplexing unit 212 multiplexes the reference signal generated by the reference signal generating unit 211 with the data signal. When this is done, during the time in which a reference signal is being transmitted from one antenna, the reference signal multiplexing unit 212 transmits nothing on the same frequency as the reference signal from the other antennas, so that the mobile terminal device 6 can receive the reference signal without the influence of signals from the other antennas. Also, the multiplexing of the reference signal by the reference signal multiplexing unit 212 may be done by insertion of a subcarrier skipping in time and frequency, such as with a scatter pilot method, and may also be time-division multiplexing.

The IFFT unit 213 transforms a signal on the frequency axis to the time axis. The CP insertion unit 214 inserts a cyclic prefix (CP) into the signal that has been transformed to the time axis. The wireless unit 215 performs D/A (digital-to-analog) conversion of the signal into which the CP has been inserted, up-converts it to the wireless frequency, and then transmits it to the mobile terminal device 6 via the transmission antenna 101.

Figure 4:
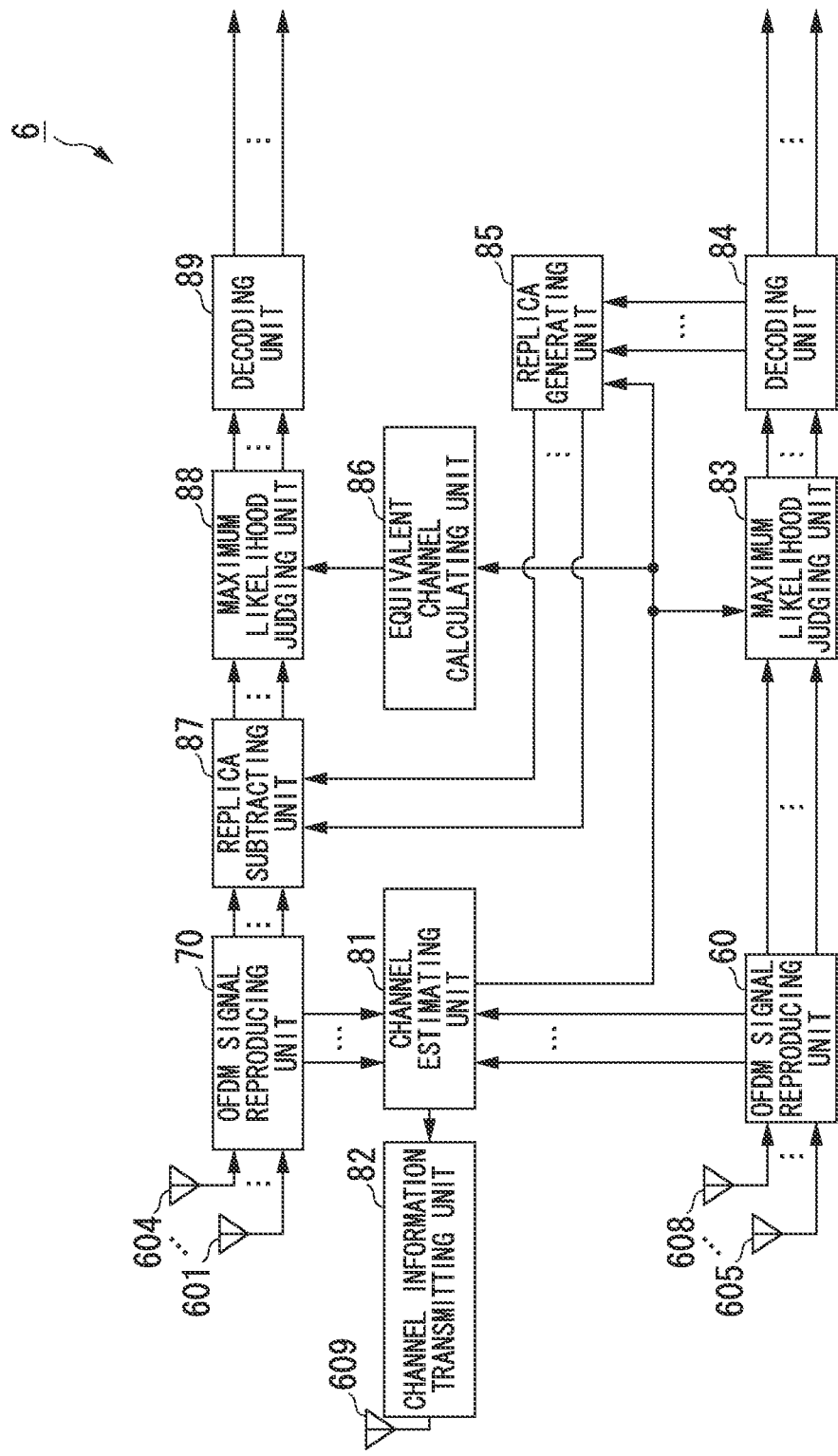
FIG. 4 is a schematic block diagram showing the configuration of the mobile terminal device 6 in the same embodiment.

FIG. 4 is a schematic block diagram showing the configuration of the mobile terminal device 6.

In FIG. 4, the mobile terminal device 6 includes OFDM signal reproducing units 60 and 70, a channel estimating unit 81, a channel information transmitting unit 82, maximum likelihood judging units 83 and 88, decoding units 84 and 89, a replica generating unit 85, an equivalent channel calculating unit 86, and a replica subtracting unit 87.

Figure 5:
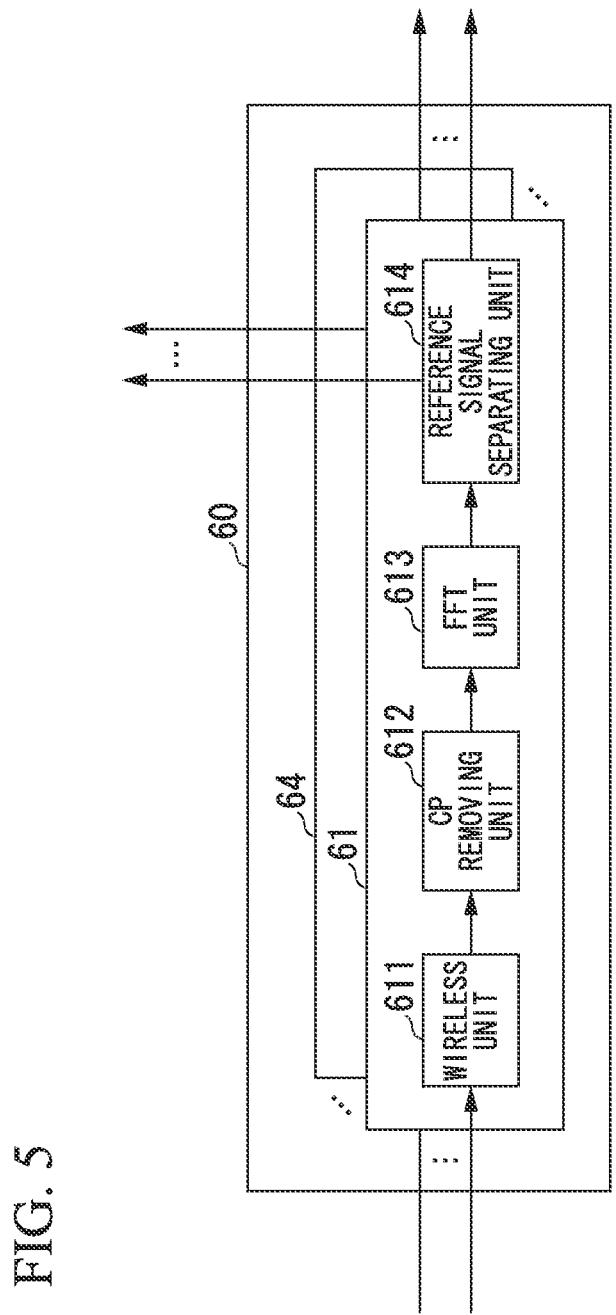
FIG. 5 is a schematic block diagram showing the configuration of an OFDM signal reproducing unit 60 in the same embodiment.

FIG. 5 is a schematic block diagram showing the configuration of the OFDM signal decoding unit 60 (FIG. 4). In FIG. 5, the OFDM signal reproducing unit 60 includes OFDM signal reproducing units 61 to 64 for each of the reception antennas. The OFDM signal reproducing units 60 and 70 receive each of the received signals $y_1$ and $y_2$ and extract the data signal and the reference signal.

The OFDM signal reproducing units 61 to 64 receive the input of the received signal from each of the reception antennas, and extract the data signal and the reference signal. Because each of the OFDM signal reproducing units 61 to 64 has the same configuration and function, a representative one (the OFDM signal reproducing unit 61) will be described. The OFDM signal reproducing unit 61 includes a wireless unit 611, a CP removing unit 612, an FFT unit 613, and a reference signal separating unit 614.

The wireless unit 611 down-converts the received signal to generate a baseband signal, which is then A/D (analog-to-digital) converted. The CP removing unit 612 removes the cyclic prefix from the digital signal that is generated by the wireless unit 611. The FFT unit 613 performs FFT transformation on the digital signal from which the cyclic prefix has been removed, transforming the time-domain signal to a frequency-domain signal. The reference signal separating unit 614 separates the signal input from the FFT unit 613 into the data signal and the reference signal, inputs the reference signal to the channel estimating unit 81, and inputs the data signal to the maximum likelihood judging unit 83.

Because the configuration and the function of the OFDM signal reproducing unit 70 are the same as those of the OFDM signal reproducing unit 60, the description thereof is omitted herein.

Returning to the description of FIG. 4, the channel estimating unit 81 receives the input of the reference signal that has been separated by the OFDM signal reproducing unit 60 or 70, and calculates the channel matrices $H_{11}$, $H_{12}$, $H_{21}$, and $H_{22}$, which indicate the frequency characteristics of the wireless channels from each of the transmission antennas to each of the reception antennas in Equation (3). The channel judging unit 81, can calculate the channel matrix using the same method as when the base station apparatus 1 calculates the channel matrix as described above.

Specifically, the channel judging unit 81 performs a channel estimation for the reference signal transmitted from the antennas 101 to 108 of the base station apparatus 1 and received by the antennas 601 to 608 of the mobile terminal device 6, and calculates the channel information for each channel from each transmission antenna to each reception antenna, so as to calculate the above-noted matrices $H_{11}$, $H_{12}$, $H_{21}$, and $H_{22}$. When this is done, during the time that a reference signal is being transmitted from one antenna, the base station apparatus 1 transmits nothing on the same frequency as the reference signal from the other antennas, so that the mobile terminal device 6 can receive the reference signal without the influence of signals transmitted from the other antennas.

The calculated channel characteristics are used by the maximum likelihood judging unit 83 in the detection of the signal data and are input to the channel information transmitting unit 82 for the purpose of feeding them back to the base station apparatus 1 as channel information.

The channel information transmitting unit 82 is connected to the antenna 609. The channel information transmitting unit 82 performs quantization and compression and the like of the channel signal (the signal that indicates the channel information), converts it to a signal format for feeding back to the base station apparatus 1, and also converts it to a wireless signal and feeds it back (transmits it) to the base station apparatus 1 via the antenna. The channel information transmitting unit 82 can also transmit information regarding the channel, and the processing performed by the channel information transmitting unit 82 is not restricted to quantization and compression. Alternatively, the channel information transmitting unit 82 may be such that it does not perform quantization and compression.

Next, the method of detection of the data performed by the maximum likelihood judging units 83 and 88 will be described. First, the maximum likelihood judging unit 83, from the channel information estimated as the received signal $y_2 = H_{22}s_2 + \eta_2$, calculates the likelihood of each spatially multiplexed signal code bit by likelihood detection. The signal point candidates of the modulated signal that can be transmitted from one transmission antenna exist as four in the QSPK that is input to the maximum likelihood judging unit 83, which is as many as there are transmission antennas. For this reason, with 4×4 MIMO receiving processing performed by the maximum likelihood judging unit 83, there are $4^4 = 256$ combinations that exist. The norm e is calculated by Equation (8) with respect to each of these 256 combinations.

$$e = \|y_2 - H_{22}S\|^2 \qquad \text{Equation (8)}$$

In Equation (8), e represents the norm value, and S represents the combinations of transmitted signals for each of all of the above-noted 256 types noted above. The maximum likelihood judging unit 83 uses Equation (8) to calculate 256 norm values e for the 256 combinations. The maximum likelihood judging unit 83 classifies the 256 norm values calculated by Equation (8) into the cases in which each of the transmitted signal bits of the modulated symbol of each antenna are 0 and the cases in which each of the transmitted signal bits is 1.

For example, the maximum likelihood judging unit 83 performs classification into the 128 norms in Equation (8) in which the first bit of each 2-bit QSPK symbol transmitted from the transmission antenna 105 is 0 and the 128 norms in Equation (8) in which the first bit of each 2-bit QSPK symbol transmitted from the transmission antenna 105 is 1. Specifically, the indices of the QPSK signal are indicated by (a, b, c, d), and if the bits corresponding to each of the indices are a="00", b="01", c="10", and d="11", the 128 norms for which the first bit is 1 are the norms obtained from (b, a to d, a to d, a to d) and (d, a to d, a to d, a to d) with the combinations of the transmission antennas.

Also, the 128 norms for which the first bit is 0 are the norms obtained from (a, a to d, a to d, a to d) and (c, a to d, a to d, a to d). These are classified for all bits for all of the transmission antennas. Next, the maximum likelihood judging unit 83 calculates the likelihood for each of the obtained bits, in accordance with Equation (9).

$$L_{m,i} = \frac{1}{\sigma^2}(\min e_{m,i,0} - \min e_{m,i,1}) \qquad \text{Equation (9)}$$

In Equation (9), $L_{m,i}$ indicates the likelihood regarding the i-th bit in the m-th transmission antenna, and $e_{m,i,0}$ and $e_{m,i,1}$ indicate respectively the norms for an i-th bit of 0 and 1 at the m-th transmission antenna. As described above, there are 128 of these norms, the minimum value of the norm for the case of an i-th bit of 0 being indicated by min $(e_{m,i,0})$ and the minimum value of the norm for the case of an i-th bit of 1 being indicated by min $(e_{m,i,1})$.

$\sigma^2$ represents the noise dispersion in the mobile terminal device 6. After calculating all of the likelihoods in this manner, error correction decoding is performed by the decoding unit 84 or 89, that is, the decoding results for the desired signal are obtained. The combination of the maximum likelihood judging unit 83 and the decoding unit 84 corresponds to a post-interference-removal desired transmitted signal group decoding unit.

The OFDM signal reproducing unit 70 that demodulates $S_1$ outputs the received signal $y1=(H_{11}-H_{12}H_{22}^{-1}H_{21})s_1+H_{12}s_2+\eta_1$, in which the transmitted signals $s_1$ and $s_2$ existed. So that the replica subtracting unit 87 can subtract the signal component regarding $s_2$, the replica generating unit 85 recodes and modulates the decoded bits so as to calculate the replica (copy) of $s_2$. Next, the replica generating unit 85 uses the channel information $H_{12}$ estimated by the channel estimating unit 81 to calculate the interference signal estimated value (interference component replica) $H_{12}s_2$.

The replica subtracting unit 87 subtracts the noise value input from the replica generating unit 85 from the signal input from the OFDM signal reproducing unit 70, and removes the signal component regarding the transmitted signal $s_2$. Then the replica subtracting unit 87 outputs the signal obtained after replica subtraction (the post-replica-subtraction signal group) to the maximum likelihood judging unit 88. The equivalent channel calculation unit 86 calculates the channel matrix $A_{11}=H_{11}-H_{12}H_{22}^{-1}H_{21}$ acting on the signal $s_1$ after replica subtraction (hereinafter referred to as the equivalent channel matrix) from the channel characteristics estimated by the channel estimated unit 81.

The maximum likelihood judging unit 88 calculates the likelihood from the equivalent channel matrix input from the equivalent channel calculation unit 86 and the signal after replica subtraction. The reproducing unit 89 performs error correction decoding in accordance with the coding method of the base station apparatus and according to the likelihood calculated by the maximum likelihood judging unit 88, so as to obtain the decoded bits, that is, the decoded results of the desired signal. In this case, the error-correction decoding method is based on maximum likelihood sequence estimation (MLSE: minimum least squares estimation) and maximum a posteriori probability (MAP) estimation. For example, with convolutional code and turbo code, a viterbi algorithm based on MLSE and a Max-Log MAP algorithm based on MAP estimation are often used.

In LDPC coding and the like, a sum-product algorithm based on MAP estimation is often used. In the broad sense, this is referred to as a BCJR (Bahl, Cocke, Jelinek, Raviv) algorithm for implementing the MAP estimation. As long as there is a specific algorithm for implementing the MAP estimation, there is no restriction on the error-correction coding algorithm. The combination of the maximum likelihood judging unit 88 and the decoding unit 89 corresponds to the non-interference-removed desired transmitted signal group decoding unit.

As described above, in this embodiment the base station apparatus 1 subtracts the interference component from the transmitted signal, so that the received signal $y_2$ is only $s_2$. The mobile terminal device 6 generates a replica from the $s_2$ decoded from the received signal $y_2$, and decodes $s_1$ using the received signals $y_1$ and $y_2$, in which $s_1$ and $s_2$ are mixed. As a result, in comparison with MLD in conventional MIMO separation at the receiving side, it is possible to reduce the amount of calculation.

For example, in the case of the QPSK modulation method in MLD that is capable of 2-bit transmission with one modulation signal in the above-described 8×8 MIMO separation, with conventional MLD with MIMO separation at the receiving side, the likelihood is calculated for all of the $4^8=65,536$ combinations of transmitted signal candidates. In contrast, at the receiving side in the present embodiment (mobile terminal device 6), because MLD is performed in 4×4 MIMO separation two times, processing to calculate the likelihood from $4^4=256$ transmitted signal candidates is performed two times. In this manner, the amount of calculation is greatly reduced. Also, in the case in which receiving processing based on a least square error rule is applied in place of MLD, accompanying an inverse matrix calculation, the number of multiplications for the inverse matrix is generally on the order of the third power of the matrix size.

For this reason, if the amount of calculation for 8×8 MIMO is $8^3=512$, at the receiving side (mobile terminal device 6) in the present embodiment, because 4×4 MIMO separation is performed two times, calculations are performed two times for an amount of calculation of $4^3=64$, so that there is a great reduction in the amount of calculation. Also, in comparison with the conventional method in which channel information is fed back for subtraction of the interference component at the transmitting side, it is seen that with the conventional method all of the channel information from $H_{11}$ up until $H_{22}$ is required. With the present embodiment, however, it is sufficient to feed back only $H_{21}$ and $H_{22}$ from the mobile terminal device 6 to the base station apparatus 1.

It is therefore possible to reduce the amount of channel information that is fed back. Also, although MLD is used as the receiving processing in the present embodiment, another signal separation method may be used. For example, signal separation processing based on a reduced-calculation maximum likelihood detection method implementing MDL with a reduced amount of calculation by an QR decomposition and an M-algorithm (QRM-MLD: maximum likelihood detection employing decomposition and M-algorithm) while reducing the number of transmitted signal candidates may be used, as may receiving processing based on MMSE, and signal processing such as ZF, or non-linear iterative equalization such as turbo equalization may also be used.

The description in this case is for a method of processing to separate an 8×8 MIMO spatially multiplexed transmission into two 4×4 MIMO spatially multiplexed transmissions. However, as noted above, it is possible to use division into a different number of antennas, such as two 2×2 MIMO spatial multiplexed transmission and 4×4 MIMO spatial multiplexing.

Second Embodiment

A wireless communication system according to a second embodiment of the present invention is described below. In the present embodiment, the description is for an embodiment in the case in which THP is applied. The base station apparatus 2 in the present embodiment performs modulo calculation (modulo calculation, remainder calculation) so as to suppress the transmitted signal power. As described regarding Equation (5), in order to cause the mobile terminal device 7 to independently receive $s_2$, the base station apparatus 2 subtracts information regarding $s_1$. Because by this subtraction there are cases in which additional transmitted signal power is required, the base station apparatus 2 suppresses the transmitted signal power that is increased by the subtraction by performing modulo calculation.

Figure 6:
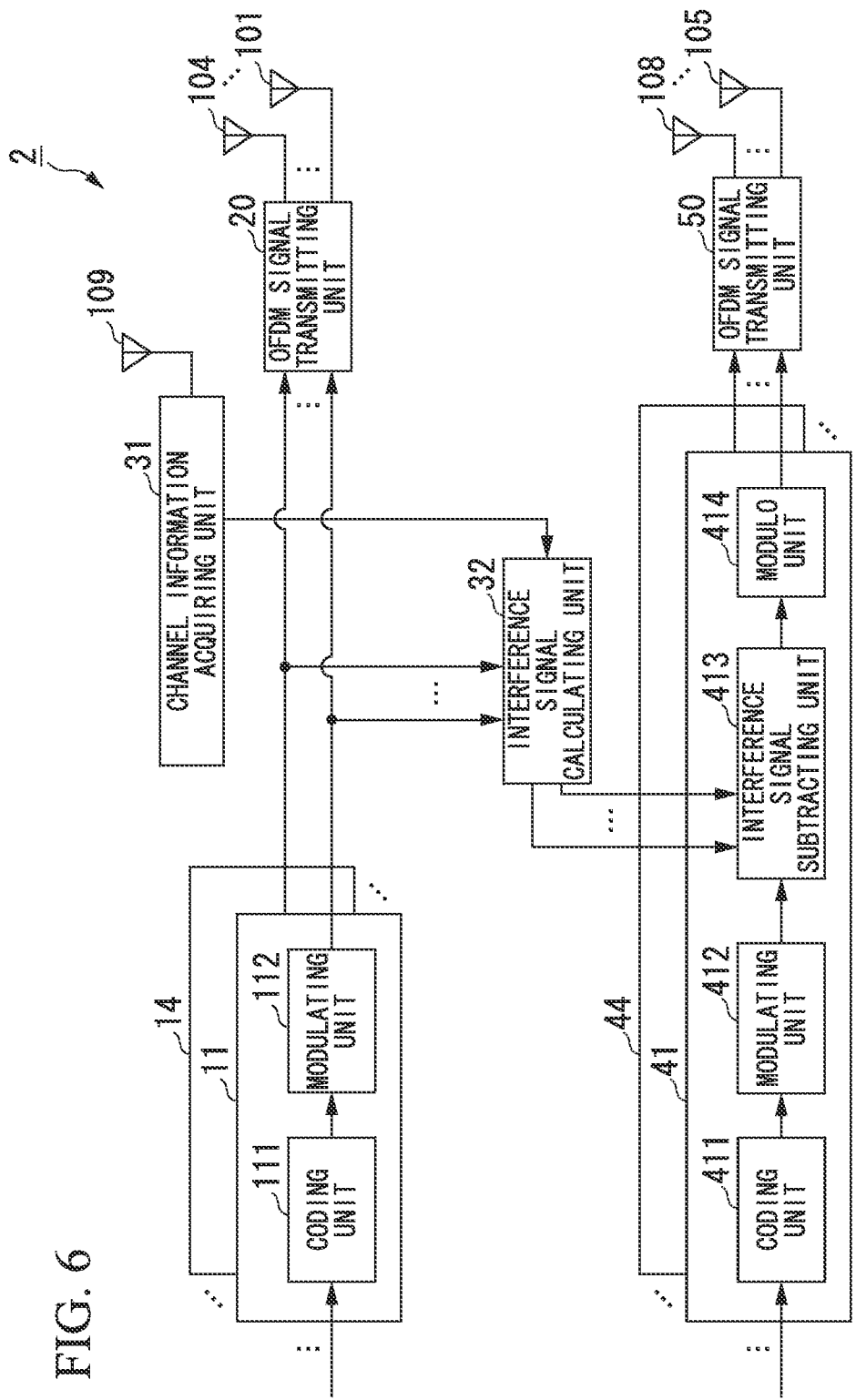
FIG. 6 is a schematic block diagram showing the configuration of the base station apparatus 2 in a second embodiment of the present invention.

FIG. 6 is a schematic block diagram showing the configuration of the base station apparatus 2. The base station apparatus 2 of FIG. 6 includes non-interference-subtracted signal generating units 11 to 14, OFDM signal transmitting units 20 and 50, a channel information acquiring unit 31, an interference signal calculating unit 32, interference-subtracted signal generating units 41 to 44, and transmission antennas 101 to 108. As described with regard to FIG. 2, the non-interferencesubtracted signal generating units 11 to 14 each have coding units 111 to 141 (not shown) and modulating units 112 to 142 (not shown).

As described with regard to FIG. 3, the OFDM signal transmitting units 20 and 50 each include a reference signal generating unit (for example, a reference signal generating unit 211), a reference signal multiplexing unit (for example, a reference signal multiplexing unit 212), an IFFT unit (for example, an IFFT unit 213), a CP inserting unit (for example, a CP inserting unit 214), and a wireless unit (for example, a wireless unit 215). The interference-subtracted signal generating units 41 to 44 each include coding units 411 to 441 (not shown), modulating units 412 to 442 (not shown), interference signal subtracting units 413 to 443 (not shown), and modulo units 414 to 444 (not shown).

In FIG. 6, parts that are the same as in FIG. 2 are assigned the same reference numerals (101 to 108, 11 to 14, 111 to 141 (only 111 is shown), 112 to 142 (only 112 is shown), 20, 31, 32, 41 to 44, 411, 412, 413, 50) and the descriptions thereof are omitted herein. The base station apparatus 2 in FIG. 6 is different from the base station apparatus 1 of FIG. 2 with regard to the point of the inclusion of the modulo unit 414 between the interference signal subtracting unit 413 and the OFDM signal transmitting unit 50.

In the interference-subtracted signal generating units 41 to 44, the modulo units 414 to 444 perform modulo calculations with respect to the each of the signals of the post-interference-subtraction signal vector $s_2 - H_{22}^{-1} H_{21} s_1$ by dividing by a prescribed constant (modulo width) to calculate the remainder. By performing the modulo calculations, the modulo units 414 to 444 limit the amplitude of the transmitted signal to within a prescribed width, thereby suppressing an increase in signal power. If a transmitted signal having a complex number amplitude of a is input from the interference signal subtracting units 413 to 443, the modulo units 414 to 444 perform a modulo calculation with a modulo width of τ, and calculate the output amplitude b as shown in Equation (10).

$$b = \mathrm{mod}_\tau(a) = a - \left\lfloor \frac{\mathrm{Re}[a]}{\tau} + \frac{1}{2} \right\rfloor \tau - j\left\lfloor \frac{\mathrm{Im}[a]}{\tau} + \frac{1}{2} \right\rfloor \tau \quad \text{Equation (10)}$$

In the above, $\lfloor c \rfloor$ indicates the floor function calculation, with c indicating the maximum integer that does not exceed c.

In Equation (10), Re[a] and Im[a] are the real part and imaginary part, respectively, of the complex number a, and j is the unit imaginary number such that $j^2 = -1$. In this case, the second and third terms in Equation (10) indicate that the size of the real and imaginary parts of a are integral multiples of τ. Given this, in Equation (10) if the floor function values (integer values) of the second and third terms are $k_I$ and $k_Q$, and $k = k_I + jk_Q$ (where $k_I$ and $k_Q$ are integers), Equation (10) is equivalent to Equation (11).

$$b = \mathrm{mod}_\tau(a) = a - k\tau \quad \text{Equation (11)}$$

As shown in Equation (11), the modulo units 414 to 444 perform a shift of $k_I$ times and $k_Q$ times indicated by τ with respect the real part and the imaginary having a width of 1 of the transmitted signal input from the interference signal subtracting units 413 to 443, so that the transmitted amplitude falls between −τ/2 and τ/2.

The modulo units 414 to 444 perform a modulo calculation with respect to the transmitted signal $x_2$, and generate the transmitted signal (power-suppressed transmitted signal group) $x'_2$ indicated by Equation (12).

$$\begin{aligned} x'_2 &= \mathrm{mod}(x_2) \\ &= \mathrm{mod}(s_2 - H_{22}^{-1} H_{21} s_1) \\ &= x_2 - k'_\tau \\ k' &= \begin{bmatrix} k_{5I} + jk_{5Q} \\ k_{6I} + jk_{6Q} \\ k_{7I} + jk_{7Q} \\ k_{8I} + jk_{8Q} \end{bmatrix} \end{aligned} \quad \text{Equation (12)}$$

In Equation (12), $k_{5I}$ to $k_{8I}$ and $k_{5Q}$ to $k_{8Q}$ are each independent integers, and the modulo units 414 to 444 perform a calculation so that the signal amplitudes of the transmission antennas 105 to 108 fall between −τ and τ.

The transmitted signal $x'_2$ generated by the modulo units 414 to 444 is converted to a wireless frequency by the OFDM signal transmitting unit 50, and transmitted from the transmission antennas 105 to 108.

Figure 7:
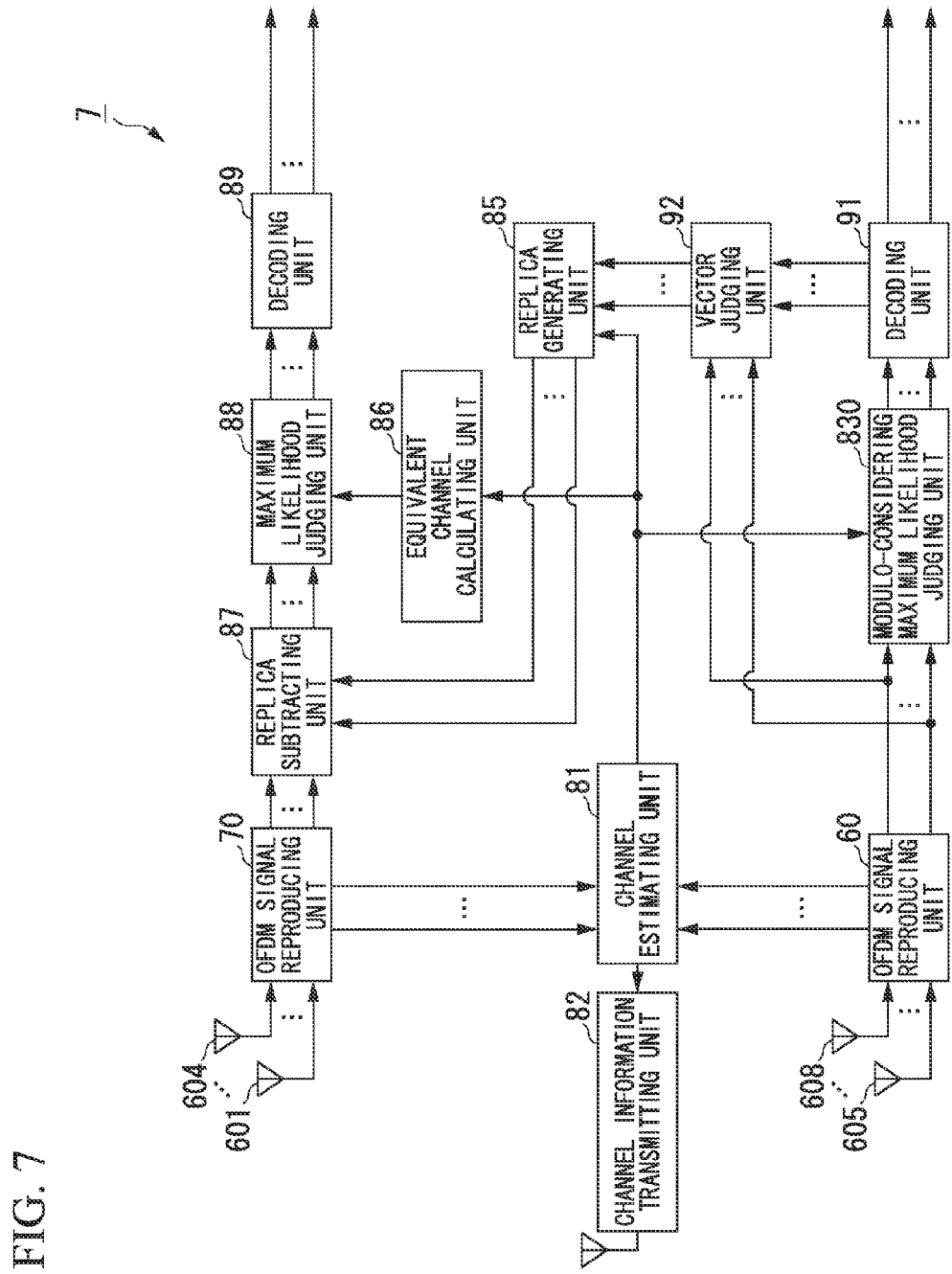
FIG. 7 is a schematic block diagram showing the configuration of a mobile terminal device 7 in the same embodiment.

FIG. 7 is a schematic block diagram showing the configuration of the base station apparatus 2. In FIG. 7, the mobile terminal device 7 includes OFDM signal reproducing units 60 and 70, a channel estimating unit 81, a channel information transmitting unit 82, a replica generating unit 85, a equivalent channel calculating unit 86, a replica subtracting unit 87, a maximum likelihood judging unit 88, a modulo-considering maximum likelihood judging unit 830, decoding units 89 and 91, and a vector judging unit 92.

In FIG. 7, parts that are the same as in FIG. 4 are assigned the same reference numerals (601 to 608, 60, 70, 81, 82, 85, 86, 87, 88, and 89) and the descriptions thereof are omitted herein. Also, because the decoding unit 91 is the same as the decoding unit 84 of FIG. 4, with the exception of the point of outputting the decoding results to the vector judging unit, its description is omitted herein.

The mobile terminal device 7 is different from the mobile terminal device 6 with regard to the point of including modulo-considering maximum likelihood judging unit 830 and vector judging unit 92 that perform processing after the OFDM signal reproducing unit 60. In the present embodiment, as described regarding FIG. 6, at the base station apparatus 2 modulo calculation by the modulo units 414 to 444 suppresses the transmitted signal power. For this reason, the mobile terminal device 7 performs reproducing processing with respect to this modulo calculation.

The reception antennas 601 to 604 of the mobile terminal device 7 receive the received signal $y_1$ of Equation (13), and the reception antennas 605 to 608 of the mobile terminal device 7 receive the received signal $y_2$ of Equation (13).

$$\begin{aligned} y_1 &= H_{11} s_1 + H_{12}(s_2 - H_{22}^{-1} H_{21} s_1 + k'\tau) + \eta_1 \\ &= (H_{11} - H_{12} H_{22}^{-1} H_{21}) s_1 + H_{12}(s_2 + k'\tau) + \eta_1 \\ y_2 &= H_{21} s_1 + H_{22}(s_2 - H_{22}^{-1} H_{21} s_1 + k'\tau) + \eta_2 \\ &= H_{22}(s_2 + k'\tau) + \eta_2 \end{aligned} \quad \text{Equation (13)}$$

The OFDM signal reproducing units 60 and 70 process the signals $y_1$ and $y_2$ received by each of the reception antennas in the same manner as the OFDM signal reproducing unit 60 described in FIG. 5. The modulo-considering maximum likelihood judging unit 830 performs calculation of the likelihood of the code bits, using the signal $y_2$ input from the OFDM signal reproducing unit 60 and the channel information $H_{22}$. In this case, the signal $y_z$, as indicated in Equation (13), includes the offset k'τ caused by the modulo calculation performed by the base station apparatus 2.

Given the above, the modulo-considering maximum likelihood judging unit 830, as noted below, considers the vector k'τ added by the modulo calculation as well, and calculates the likelihood of the code bits. In this case, similar to the case of the first embodiment, whereas the modulo width τ is known at the mobile terminal device 7, k' is unknown. In this case, the signal point candidates from each of the transmission antennas repeated infinitely. For this reason, in the case of applying MLD, the amount of calculation required to calculate the likelihoods for all of the candidate points becomes large.

Given this, in the present embodiment the amount of calculation performed as the modulo-considering maximum likelihood judging unit is equal to or less than the case of performing this calculation by a conventional MLD. The usable methods of solving this are either the method of provisionally judging k' before the MLD, or the method of treating k' as an unknown and reducing the number of transmitted signal candidates.

In this case, the method of the modulo-considering maximum likelihood judging unit 830 provisionally judging k' will be described. The signal $y_2$ that the OFDM signal reproducing unit 60 outputs to the modulo-considering maximum likelihood judging unit 830 has the transmitted signal point candidates shifted by the modulo calculation performed by the base station apparatus 2. Given this, the modulo-considering maximum likelihood judging unit 830 calculates a vector k' that represents this shift amount as a provisional value.

First, the modulo-considering maximum likelihood judging unit 830 performs the inverse matrix calculation of Equation (14) with respect to $y_2$ in Equation (13) in order to obtain a provisional judgment of k', and generates a signal $y'_2$ provisionally separated from the desired signal for each transmission antenna.

$$y'_2 = H_{22}^{-1} y_2 \qquad \text{Equation (14)}$$
$$= (s_2 + k'\tau) + H_{22}^{-1}\eta_2$$

FIG. 8 is a configuration diagram showing the configuration on the complex plane of the transmitted signal point candidates corresponding to the signal from one transmission antenna provisionally separated by the modulo-considering maximum likelihood judging unit 830.

In FIG. 8, the coordinate axis I-ch indicates the real number axis, and the coordinate axis Q-ch indicates the imaginary number axis, these two axes constituting the complex plane. Each of the points shown as a black circle indicates a transmitted signal point candidate. Each of the parts surrounded by dotted lines is an individual space obtained by the base station apparatus 2 dividing the complex plane by a modulo calculation using the division width of τ.

As shown in FIG. 8, in the condition in which the shift amount by the modulo calculation is unknown, the transmitted signal point candidates are spread infinitely over the complex plane. For example, in the case of a "1" and "1" combination of two bits transmitted by QPSK, the unshifted transmitted signal point is indicated by the point $(1+j)/(\sqrt{2})$. However, if k' is unknown and the value of τ is $2\sqrt{2}$, which is ideal in QSPK, adding integral multiples of $2\sqrt{2}$, such as $(5+j)/(\sqrt{2})$, $(-3+j)/(\sqrt{2})$, or $(1+5j)/\sqrt{2}$ will result in the same transmitted signal point candidate as the transmitted bits.

Given the above, the modulo-considering maximum likelihood judging unit 830 calculates the transmitted signal point candidate closest to the received signal amplitudes from each of the transmitted antennas provisionally separated by Equation (14) the transmitted signal point candidate that results in "1" and "1". Then, the modulo-considering maximum likelihood judging unit 830 calculates how many modulo widths there are from that point to $1/(\sqrt{2})(1+j)$ so as to provisionally calculate the vector k' representing the shift amount. For example, in the case in which the "1" and "1" transmitted amplitude is closest to the received signal point is $1/(\sqrt{2})(9+5j)$, the modulo-considering maximum likelihood judging unit 830 uses Equation (15) to calculate the $k_I$ in the real part and the $k_Q$ in the imaginary part.

$$\left.\begin{aligned} k_I &= -\frac{\left(\frac{9}{\sqrt{2}} - \frac{1}{\sqrt{2}}\right)}{2\sqrt{2}} = 2 \\ k_Q &= -\frac{\left(\frac{5}{\sqrt{2}} - \frac{1}{\sqrt{2}}\right)}{2\sqrt{2}} = 1 \end{aligned}\right\} \qquad \text{Equation (15)}$$

In this case, the application of the minus sign is because k' is subtracted in Equation (12). This processing is performed for all the transmitted signals $s_2$ in Equation (14), and a provisional judgment is made of k' that is represented by $k_{5I}$ to $k_{8I}$ and $k_{5Q}$ to $k_{8Q}$ in Equation (12). After that, the provisionally judged k' is used to perform MLD, and to obtain the LLR (log likelihood ratio) of the coded bits. Although the method of performing the provisional judgment of k' used in this case is ZF, which does not consider noise, methods such as MMSE may also be used.

QRM-MLD exists as a method that does not perform provisional judgment. In the case in which the base station apparatus 2 performs a modulo calculation, as described above the transmitted signal point candidate points spread out infinitely. With QRM-MLD, however, it is possible to eliminate signal point candidate points starting from those that have a low transmission probability, thereby enabling a reduction in the amount of calculation. By using QRM-MLD, the modulo-considering maximum likelihood judging unit 830 can perform maximum likelihood judgment without making a provisional judgment. Also, although in the case of a provisional judgment there is the possibility of deterioration in the MLD due to the error in k', because with the latter method detection is based on probability, accuracy is higher when using a method such as QRM-MLD.

The reproducing unit 91 performs decoding with respect to the signal input from the modulo-considering maximum likelihood judging unit 830, thereby obtaining the decoded bits. The combination of the modulo-considering maximum likelihood judging unit 830 and the reproducing unit 91 corresponds to a post-interference-removal desired transmitted signal group decoding unit.

The vector judging unit 92, based on the replica obtained by performing recoding and modulation of the reproduction results and the received signal $y_2=H_{22}(s_2+k'\tau)+\eta_2$, estimates (calculates) k'. The vector judging unit 92 subtracts the product of the replica $s'_2$ and the $H_{22}s'_2$ from the received signal, dividing by the modulo width τ to estimate k'. Specifically, the vector judging unit 92 takes k' to be each of the real and imaginary parts of each element of $(y_2-H_{22}s'_2)$ rounded to the first place beyond the decimal point. This k' is indicated in Equation (16).

$$k' = \left\lfloor \frac{y_2 - H_{22}s'_2}{\tau} + \frac{1}{2} \right\rfloor \quad \text{Equation (16)}$$

In the above $$\left\lfloor \frac{y_2 - H_{22}s'_2}{\tau} + \frac{1}{2} \right\rfloor$$

result for the real and imaginary parts of each of the elements of $$\frac{y_2 - H_{22}s'_2}{\tau}.$$

In the above, k' is the vector having complex elements that have integer real and imaginary parts. For this reason, the vector judging unit 92, as shown in Equation (16), uses a floor function to round the influence of noise included in $y_2$. When rounding is done in this manner, it is possible that quantizing noise error is included in the vector k'. In consideration of this, k' may be taken to be $k'=(y_2-H_{22}s'_2)$.

The replica generating unit 85 uses the k' estimated by the vector judging unit 92 to perform the calculation of $H_{22}(s'_2+k'\tau)$ of Equation (13) which is input to the replica subtracting unit 87. The processing at the replica subtracting unit 87 and thereafter is the same as in the first embodiment, and decoding unit 89 generates the decoded signal $s_1$.

As described above, even in the case in which modulo calculation is performed for the purpose of suppressing the transmitted signal power such as with THP, by performing the processing of the present embodiment, it is possible to achieve the same effect as the first embodiment.

Also, similar to the first embodiment, the communication apparatus of the present embodiment is not restricted to the base station apparatus and the mobile terminal device. The number of base station apparatus 2 and the mobile terminal device 7 antennas are not limited to eight, and the method of dividing the transmitted data is not restricted to two transmitted signal data from four antennas. Additionally, the communication system between the base station apparatus 2 and the mobile terminal device 7 is not restricted to OFDM, and the modulation method is not restricted to QPSK.

A program for implementing the function of all or part of the base station apparatus 1 shown in FIG. 2 and FIG. 3, all or part of the mobile terminal device 6 shown in FIG. 4 and FIG. 5, all or part of the base station apparatus 2 shown in FIG. 6, and all or part of the mobile terminal device 7 shown in FIG. 7 may be recorded into a computer-readable storage medium. A computer system may then be cause to read in and execute the program recorded in the storage medium so as to perform the processing of the various parts. In this case, the term "computer system" encompasses an operating system and peripheral devices and the like.

If the "computer system" uses the WWW system, the computer system encompasses a website providing environment (or display environment).

The "computer-readable storage medium" refers to a removable medium such as flexible disk, an opto-magnetic disk, a ROM, a CD-ROM or the like, and a storage apparatus such as a hard disk or the like which is built into a computer system. Additionally, "computer-readable storage medium" includes one which over a short period of time dynamically holds a program, such as the case in which a program is transmitted via a network such as the Internet or via a telephone line, in which case it would also include a volatile memory within a server or client that holds the program for a certain amount of time. The above-noted program may be for the purpose of implementing a part of the above-described functions, and further may be such that it is capable of implementing the above-described functions in combination with a program that has already be stored in the computer system.

Although the above has been a description of embodiments of the present invention, with references made to the drawings, the specific configuration thereof is not restricted to the embodiments, and encompasses design changes within a scope that does not go beyond the essence of the present invention.

INDUSTRIAL APPLICABILITY

The present invention is suitable for use in a wireless communication apparatus, a wireless communication system, and a communication method.

REFERENCE SYMBOLS

1, 2: Base station apparatus
6, 7: Mobile terminal device
101 to 108: Transmission antenna
11 to 14: Non-interference-subtracted signal generating unit
20: OFDM signal transmitting unit
31: Channel information acquiring unit
32: Interference signal calculating unit
41 to 44: Interference-subtracted signal generating unit
411 to 414: Modulo unit
50: OFDM signal transmitting unit
601 to 608: Reception antenna
60, 70: OFDM signal reproducing unit
81: Channel estimating unit
82: Channel information transmitting unit
83, 88: Maximum likelihood judging unit
830: Modulo-considering maximum likelihood judging unit
84, 89, 91: Decoding unit
85: Replica generating unit
86: Equivalent channel calculation unit
87: Replica subtracting unit
92: Vector judging unit

The invention claimed is:
1. A wireless communication apparatus comprising:
a channel information acquiring unit that, based on a received signal, acquires a transmitted signal channel matrix that is channel information as a transmitted signal of a pre-interference-removal transmitted signal group and an interference signal channel matrix that is channel information as an interference signal of the non-interference-removed transmitted signal group;
an interference signal calculating unit that generates an interference signal group at the time of reception by the non-interference-removed transmitted signal group with respect to the pre-interference-removal transmitted signal group, based on the pre-interference-removal transmitted signal group, the non-interference-removed transmitted signal group, the transmitted signal channel matrix, and the interference signal channel matrix;
an interference signal subtracting unit that subtracts the interference signal group from the pre-interference-re- moval transmitted signal group to generate a post-interference-removal transmitted signal group; and a transmission antenna group that transmits the post-interference-removal transmitted signal group and the non-interference-removed transmitted signal group from mutually different transmission antennas.

2. The wireless communication apparatus according to claim 1, further comprising:
a modulo unit in which each signal of the post-interference-removal transmitted signal group is divided by a modulo width that is a pre-established constant and determines the remainder to generate a power-suppressed transmitted signal group;
wherein the transmission antenna group transmits a power-suppressed transmitted signal group and the non-interference-removed transmitted signal group from mutually different transmission antennas.

3. A wireless communication apparatus comprising:
a plurality of antennas that receive a post-interference-removal transmitted signal group and a non-interference-removed transmitted signal group;
a post-interference-removal desired transmitted signal group decoding unit that decodes the desired signal with respect to the received post-interference-removal transmitted signal group to generate a desired signal estimated value group;
a replica generating unit that calculates an estimated value of an interference signal of the post-interference-removal transmitted signal group with respect to the non-interference-removed transmitted signal group from the desired signal estimated value group;
a replica subtracting unit that subtracts a estimated value of the interference signal from the received the non-interference-removed transmitted signal group to generate a post-replica-subtracted signal group; and
a non-interference-removed desired transmitted signal group decoding unit that decodes the desired signal with respect to the post-replica-subtracted signal group.

4. The wireless communication apparatus according to claim 3 wherein
the plurality of antennas receives the power-suppressed transmitted signal group and the non-interference-removed transmitted signal group;
the post-interference-removal desired transmitted signal group decoding unit calculates, based on an amplitude of the received power-suppressed transmitted signal group, a shift amount by a remainder operation that is performed with respect to the power-suppressed transmitted signal group to generate a desired signal estimated value group using the shift amount; and wherein
the replica generating unit generates a replica signal group of the interference components of the power-suppressed transmitted signal group with respect to the non-interference-removed transmitted signal group from a shift amount by the remainder operation that is performed with respect to the desired signal estimated value group and the power-suppressed transmitted signal group.

5. A wireless communication system comprising a transmitting-side communication apparatus for a desired signal and a receiving-side communication apparatus for a desired signal, wherein
the transmitting-side communication apparatus for a desired signal comprising:
a channel information acquiring unit that, based on the received signal, acquires a transmitted signal channel matrix that is channel information as a transmitted signal of a pre-interference-removal transmitted signal group and an interference signal channel matrix that is channel information as an interference signal of the non-interference-removed transmitted signal group;
an interference signal calculating unit that generates an interference signal group at the time of reception by the non-interference-removed transmitted signal group with respect to the pre-interference-removal transmitted signal group, based on the pre-interference-removal transmitted signal group, the non-interference-removed transmitted signal group, the transmitted signal channel matrix and the interference signal channel matrix;
an interference signal subtracting unit that subtracts the interference signal group from the pre-interference-removal transmitted signal group to generate a post-interference-removal transmitted signal group; and
a transmission antenna group that transmits the post-interference-removal transmitted signal group and the non-interference-removed transmitted signal group from mutually different transmission antennas; and
a receiving-side communication apparatus for a desired signal comprising: a plurality of antennas that receive a post-interference-removal transmitted signal group and a non-interference-removed transmitted signal group;
a post-interference-removal desired-transmitted signal group decoding unit that decodes the desired signal with respect to the received post-interference-removal transmitted signal group to generate a desired signal estimated value group;
a replica generating unit that calculates an estimated value of an interference signal of the post-interference-removal transmitted signal group with respect to the non-interference-removed transmitted signal group from the desired signal estimated value group;
a replica subtracting unit that subtracts a estimated value of the interference signal from the received the non-interference-removed transmitted signal group to generate a post-replica-subtracted signal group; and
a non-interference-removed desired transmitted signal group decoding unit that decodes the desired signal with respect to the post-replica-subtracted signal group.

6. The wireless communication system according to claim 5, the transmitting-side communication apparatus for a desired signal further comprising:
a modulo unit in which each signal of the post-interference-removal transmitted signal group is divided by a modulo width that is a pre-established constant and determines the remainder to generate a power-suppressed transmitted signal group; and
in which the transmission antenna group transmits the power-suppressed transmitted signal group and the non-interference-removed transmitted signal group from mutually different transmission antennas; and wherein
in the receiving-side communication apparatus for a desired signal,
the plurality of antennas receives power-suppressed transmitted signal group and the non-interference-removed transmitted signal group;
the post-interference-removal desired transmitted signal group decoding unit calculates, based on an amplitude of the received power-suppressed transmitted signal group, a shift amount by a remainder operation that is performed with respect to the power-suppressed transmitted signal group to generate a desired signal estimated value group, using the sift amount; and wherein
the replica generating unit generates a replica signal group of the interference components of the power-suppressed transmitted signal group with respect to the non-interference-removed transmitted signal group from a shift amount by a remainder operation that is performed with respect to the desired signal estimated value group and the power-suppressed transmitted signal group.

7. A communication method: wherein;

a first communication apparatus that has a plurality of transmission antennas and that transmits a plurality of transmitted signals on one and the same carrier frequency at one and the same time divides the plurality of transmitted signals into a plurality of groups and, with respect to one group of transmitted signals, uses signals that have had the interference signal subtracted beforehand; and a second communication apparatus that has a plurality of reception antennas and that receives the plurality of transmitted signals being spatially multiplexed, by receiving the transmitted signals from which the interference signal is subtracted beforehand, decodes the received signals of this group and also decodes transmitted signals belonging to another group by using the decoded signals.

* * * * *